F. X. MUDD & W. P. JOHNSON.
POULTRY CAR.
APPLICATION FILED SEPT. 23, 1915.
1,168,821.
Patented Jan. 18, 1916.
2 SHEETS—SHEET 1.
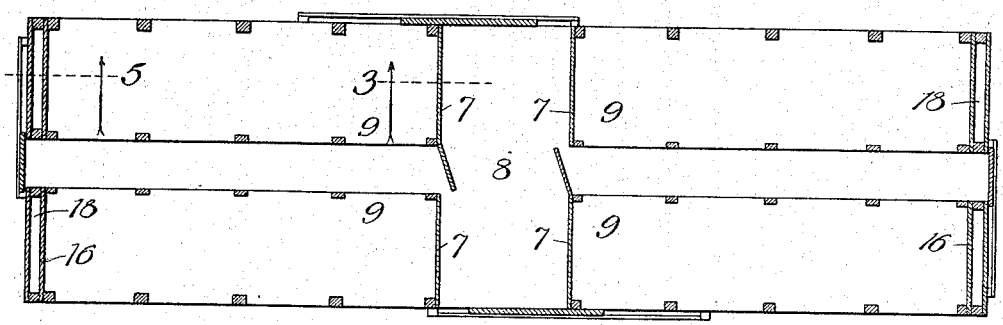
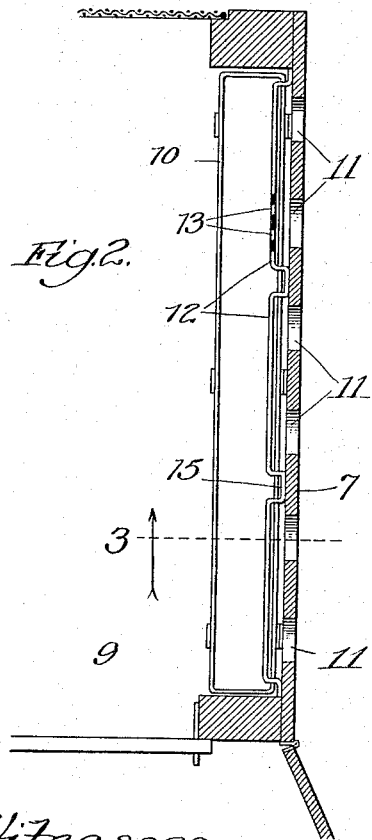
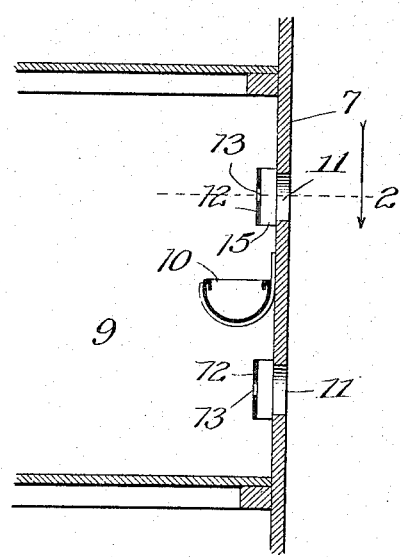
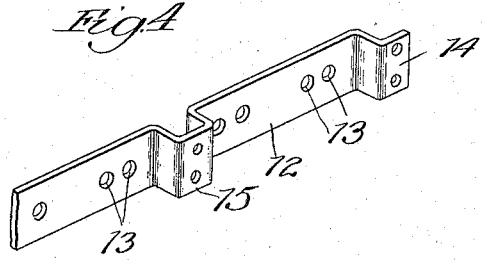
Witnesses
Inventor:
Frank X. Mudd,
Waldo P. Johnson
By Dyrenforth, Lee, Chritton & Wiles,
Attys.

F. X. MUDD & W. P. JOHNSON.
POULTRY CAR.
APPLICATION FILED SEPT. 23, 1915.
1,168,821.
Patented Jan. 18, 1916.
2 SHEETS—SHEET 2.
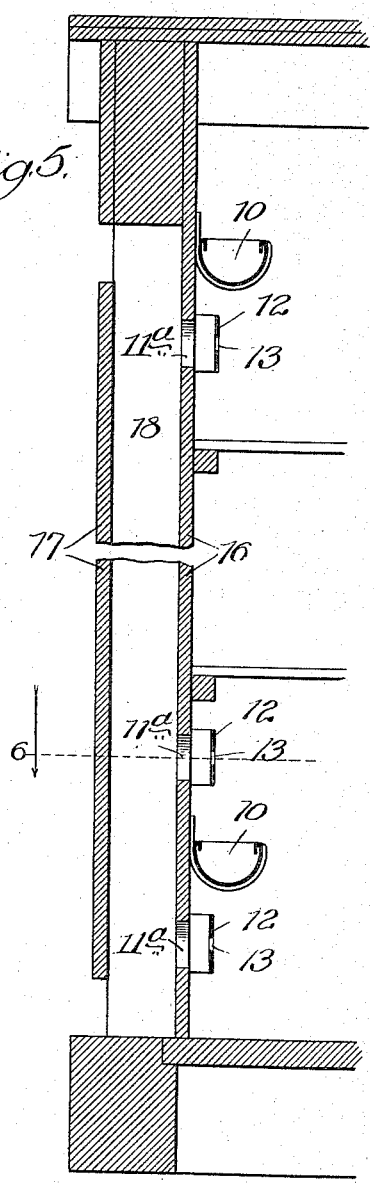
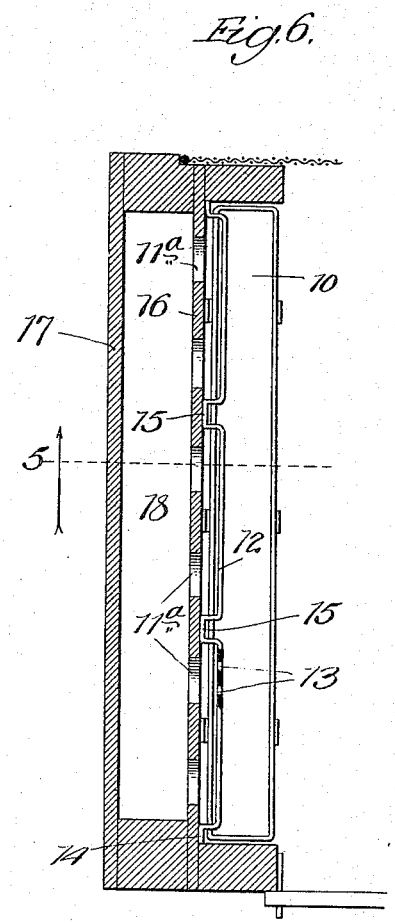

UNITED STATES PATENT OFFICE.

FRANK X. MUDD AND WALDO P. JOHNSON, OF CHICAGO, ILLINOIS; SAID JOHNSON ASSIGNOR TO SAID MUDD.

POULTRY-CAR.

1,168,821. Specification of Letters Patent. Patented Jan. 18, 1916.

Application filed September 23, 1915. Serial No. 52,243.

*To all whom it may concern:*

Be it known that we, FRANK X. MUDD and WALDO P. JOHNSON, citizens of the United States, residing at Chicago, in the county of Cook and State of Illinois, have invented new and useful Improvements in Poultry-Cars, of which the following is a specification.

In shipping live poultry in a car provided with tiers of coops on opposite sides of a central aisle bisected by a central stateroom for the attendants extending between the side-doors of the car, difficulty is experienced in ventilating the coops immediately adjacent the state-room and those occupying corresponding positions relatively to the end-walls of the car, sufficiently for the well-being of the poultry in those particular coops. To overcome this condition as to the coops nearest the state-room, it has been our practice to provide in the walls, which are common to the state-room and the adjacent coops, a series of apertures above and below the trough in each coop, through which to augment ventilation of the latter. The state-room, however, is a convenient storage-place for dry feed, which the attendants use for the storage-purpose, placing the feed-bags against the walls. This induces the poultry to peck, through the ventilating apertures, holes in the bags and gorge themselves with the dry feed from their contents, which is harmful and frequently results in death to the creatures. Moreover, the ventilating holes thus provided induce the poultry, for access to them, to crowd and pack underneath the adjacent troughs and become maimed and often killed by thus packing; and it also invites the poultry to stand on the trough, for access to the ventilating apertures and through them to the feed-bags, which is a common cause of filth being introduced into the trough. No provision is made for adequately ventilating the end-coops having their outer walls formed by the end-walls of the car, so that the poultry in those coops suffer and frequently die from the effect of insufficient ventilation.

It is the object of our invention to overcome these difficulties; and this we accomplish by the means hereinafter described and illustrated in the accompanying drawings, in which—

Figure 1 is a plan view, diagrammatic in character, of a poultry-car provided with our improvements, the roof being omitted to display the interior of the car; Fig. 2 is a section on line 2, Fig. 3; Fig. 3 is a section on line 3, Fig. 1 and enlarged, or on line 3, Fig. 2; Fig. 4 is a perspective view of a ventilating spacing-bar detail; Fig. 5 is a section on line 5, Fig. 1 and enlarged, or on line 5, Fig. 6, and Fig. 6 is a section on line 6, Fig. 5.

The construction of the interior of the poultry-car may be generally that of poultry-shipping cars in common use, which is well-known in the art.

The walls 7 of the state-room 8 (Fig 1) form the outer walls of the innermost coops 9, each of which is provided with a trough 10 (Fig. 3) hung on the inner face of the respective wall 7, which has provided in it horizontal series of ventilating apertures 11, respectively above and below the trough and preferably about midway between the trough and the top and bottom of the coop. To prevent the poultry in these coops from becoming packed underneath or standing on the troughs, and from protruding their heads or beaks through the apertures 11, with the undesirable consequences hereinbefore recited, we secure on the inner surface of each wall 7 and in spaced relation thereto, a ventilating bar 12, one for each row of apertures 11 and extending lengthwise of and covering the same; each bar containing apertures 13, of which two are in position to register with each aperture 12, these bar apertures being relatively small to preclude the poultry from protruding their heads through them. The bar is provided with offsets 14 at its ends and intermediate offset sections 15, for spacing it from the wall to which it is fastened, as by nails or screws (not shown) driven into it through holes, shown in Fig. 4, to be used for the purpose. By thus providing ventilating bars to extend over the rows of apertures 11, and therefore midway between the troughs and the tops and bottoms of the coops, the poultry are not only prevented from packing beneath and standing on the troughs, but the bars, being spaced from the apertures 11 and having coincident with the latter their contained relatively-small apertures 13, do not obstruct the ventilation for which the apertures 11 are provided, while they serve to prevent access to the latter of the poultry.

For augmenting ventilation of the coops nearest the outer ends of the car, we provide in each end-wall 16 of the latter, (forming the outer walls for the adjacent tiers of coops and carrying a trough 10 in each coop, about midway of its height, as represented of the trough shown in Fig. 3, but on the relatively opposite side of the coop) series of ventilating apertures 11ª extending above and below the troughs, like the apertures 11 in the walls 7; and we also provide an outer imperforate wall 17, of wood or sheet-metal, spaced from the wall 16 to form an open-ended flue 18. The flues, with which these end-coops communicate through the apertures 11ª, while shielding the coops in rainy and stormy weather, induce, especially when the car is in motion, circulation of air through the coops, to adequately ventilate them.

If desired, a bar, like the apertured bar 12 shown, or any other suitable bar, may be secured in place to cover each row of apertures 11ª in the same way as do the ventilating bars in the innermost coops 9, to serve as barriers against packing of the poultry underneath the coops and their standing on the troughs.

We realize that considerable variation is possible in the details of construction thus specifically shown and described and we do not intend to be limited thereto; our intention being in the following claims to claim protection upon all the novelty there may be in our invention as broadly as the state of the art will permit.

What we claim as new and desire to secure by Letters Patent is—

1. In a poultry-car containing tiers of coops, an aisle, and a state-room extending across the coops and aisle, walls common to the state-room and the coops adjacent thereto and provided with ventilating openings therethrough, and ventilating bars secured to said walls in spaced relation thereto and covering the apertures in the latter.

2. In a poultry-car containing tiers of coops, an aisle, and a state-room extending across the coops and aisle, walls common to the state-room and the coops adjacent thereto and provided with ventilating openings therethrough, and apertured bars secured to said walls in spaced relation thereto and covering the apertures in the latter.

3. In a poultry-car containing tiers of coops, an aisle, and a state-room extending across the coops and aisle, walls common to the state-room and the coops adjacent thereto and provided with ventilating openings therethrough, and apertured bars provided with offsets through which they are fastened in spaced relation to said walls to cover the apertures therein.

4. In a poultry-car containing tiers of coops, an aisle, and a state-room extending across the coops and aisle and having troughs on the inner sides of the walls common to the state-room and the adjacent coops and provided with rows of ventilating apertures outside the planes of the troughs, and ventilating bars secured to said walls in spaced relation thereto to extend lengthwise of and cover said apertures.

5. In a poultry-car containing tiers of coops, an aisle, and a state-room extending across the coops and aisle, and having troughs on the inner sides of the walls common to the state-room and the adjacent coops, the said walls being provided with rows of ventilating apertures above and below the planes of the troughs, and bars containing relatively-small ventilating apertures and offsets through which they are secured to said walls to extend in spaced relation thereto and lengthwise of said rows of apertures to cover them.

6. In a poultry-car containing tiers of coops, an aisle, and a state-room extending across the coops and aisle, and having troughs on the inner sides of the walls common to the state-room and adjacent coops, the said walls being provided with rows of relatively-large ventilating apertures above and below the planes of the troughs thereon, and bars provided with offsets and secured to said walls, in spaced relation thereto, to extend lengthwise of and cover said rows of wall-apertures, said bars containing relatively-small apertures, of which a plurality register with each of said relatively-large apertures.

7. In a poultry-car containing tiers of coops, flues on the end-walls of the car having their ends open to the atmosphere, and a wall dividing the coops at the car ends from said flues and having ventilating openings therein.

8. In a poultry-car containing tiers of coops, car end-walls forming the end-walls of adjacent coops and provided with ventilating openings therethrough, and outer imperforate walls on and spaced from said end-walls and forming with the latter flues having their ends open to the atmosphere.

9. In a poultry-car containing tiers of trough-equipped coops, the end-walls of the car forming the end-walls of adjacent coops and provided with rows of ventilating openings, and outer imperforate walls on and spaced from said end-walls forming flues having their ends open to the atmosphere and into which flues said apertures lead.

FRANK X. MUDD.
WALDO P. JOHNSON.

In presence of—
K. O'NEILL,
O. C. AVISUS.

Copies of this patent may be obtained for five cents each, by addressing the "Commissioner of Patents. Washington, D. C."